United States Patent [19]
Fandel et al.

[11] Patent Number: 5,843,377
[45] Date of Patent: Dec. 1, 1998

[54] CONTAINED SEPARATION SYSTEM FOR FCC REACTION DOWNCOMER

[75] Inventors: James A. Fandel, Schaumburg; David A. Lomas, Barrington; Steven Niewiedzial, Hoffman Estates; Daniel R. Johnson, Schaumburg; James Althoff, Arlington Heights, all of Ill.

[73] Assignee: UOP LLC, Des Plaines, Ill.

[21] Appl. No.: 703,236

[22] Filed: Aug. 26, 1996

[51] Int. Cl.$^6$ .................................................. F27B 15/08
[52] U.S. Cl. ........................ 422/144; 422/145; 422/147
[58] Field of Search ................................. 422/144–145, 422/147; 208/161, 153

[56] References Cited

U.S. PATENT DOCUMENTS

| | | | |
|---|---|---|---|
| 3,074,878 | 1/1963 | Pappas | 208/127 |
| 4,385,985 | 5/1983 | Gross et al. | 208/113 |
| 4,482,451 | 11/1984 | Kemp | 208/161 |
| 4,514,285 | 4/1985 | Niccum et al. | 208/143 |
| 4,778,660 | 10/1988 | Haddad et al. | 422/144 |
| 5,344,554 | 9/1994 | Pontier et al. | 208/164 |
| 5,449,498 | 9/1995 | Cetinkaya | 422/144 |

*Primary Examiner*—Hien Tran
*Attorney, Agent, or Firm*—Thomas K. McBride; John G. Tolomei

[57] ABSTRACT

An FCC separation arrangement for a catalyst and hydrocarbon contacting zone having a downcomer terminus section uses a compact separation vessel to provide a quick separation between catalyst and hydrocarbon gases in a compact area that also accommodates the use of cyclone separators for a further removal of catalyst from the hydrocarbon gases. The separation system uses a gas collection conduit that incorporates an expansion element for accommodating differential growth between the riser separation vessel and cyclones in the same compact area. The system is suitable for single downcomers or multiple downcomers. The system can be used with a closed containment vessel or in an entirely open system that eliminates the use of a containment vessel.

17 Claims, 3 Drawing Sheets

CONTAINED SEPARATION SYSTEM FOR FCC REACTION DOWNCOMER

BACKGROUND OF THE INVENTION

1. Field of the Invention

This invention relates generally to processes for the separation of solid catalyst particles from gases and catalyst. More specifically, this invention relates to the separation of catalyst and gaseous material from mixtures thereof in an FCC process having a reaction downcomer.

2. Description of the Prior Art

Cyclonic methods for the separation of solids from gases are well known and commonly used. A particularly well known application of such methods is in the hydrocarbon processing industry where particulate catalyst contacts gaseous reactants as fluidized mixtures to effect chemical conversion of the gas stream components and/or physical changes in the particles undergoing contact with the gas stream.

The fluidized catalytic cracking process (FCC) presents a familiar example of a process that uses gas streams to contact a finely divided stream of catalyst particles and to effect reaction between the gas and the particles. Formerly, contact of a hydrocarbon gas stream with the finely divided catalyst took place in a large vessel that maintained a dense bed of catalyst. Vaporized hydrocarbons bubbled through the bed and were collected above the bed. Through the evolution of FCC units elongate riser conduits for contacting FCC feed with catalyst particles commonly replaced the high density catalyst beds. These conduits were typically arranged to transport catalyst and gases upwardly as contacting and conversion took place. It is also known that the FCC process can be arranged with a downcomer section that contacts the catalyst and hydrocarbons as the heterogeneous mix travels downwardly within the conduit. The downcomer may comprise a final section of a total riser or an entire FCC riser may be designed as a downcomer cocurrent contacting zone. Examples of downcomer arrangements for FCC risers are shown in U.S. Pat. Nos. 3,074,878; 4,385,985; 4,514,285; and 5,344,554; the contents of which are hereby incorporated by reference.

Downcomer arrangements for FCC gas and catalyst contacting have the disadvantage of passing through the section of the FCC layout that is usually occupied by the cyclone separators and other separation equipment for the removal of catalyst from the gas streams. Typical separation systems for downcomer arrangements use "open" catalyst separation systems where the catalyst and gases from the downcomer section are discharged into a large open vessel. Separation of gases from the catalyst takes place as catalyst enters cyclone separators contained within the large disengaging vessel. The system is referred to as "open" due to the relatively long residence time that vapors can have in the large, open vessel. In contrast to an "open" system, "closed" FCC systems have conduits that directly transport catalyst and hydrocarbon gases from a riser outlet to the inlets of cyclones or provide a low volume separation vessel into which the riser discharges catalyst and hydrocarbons. Most closed separation systems that use a reduced volume containment vessel also transport gases to a secondary separation device such as FCC cyclones for removal of fine catalyst particles that may be entrained with the gas stream. U.S. Pat. No. 4,482,451 discloses an example of this latter type of system.

In U.S. Pat. No. 4,482,451 a central riser extends into the separation vessel. The outlet arrangement of the central riser uses radially extended arms to impart a centripetal acceleration on the particulate material so that it exits the arm with a tangential velocity. The centripetal separation begins the cyclonic separation of particles from gases. The cyclonic separation disengages hydrocarbon vapors from the catalyst particles causing the hydrocarbon vapors to rise out of the separation vessel and the catalyst particles to swirl to the bottom.

Arranging a compact and efficient separation assembly for a downcomer riser also complicates the provision of means for supporting secondary separators such as cyclones along with the separation vessel and riser. Changes in temperature, gas flow and conductivity between the different portions of the riser, separator vessel, cyclone and connecting conduits produce relatively different expansions of the connected equipment. These differential expansions primarily occur in the vertical direction. Even small amounts of differential expansion are detrimental to the equipment since they can—over a cycle of start-ups and shut-downs—cause fatigue failure of the equipment. It is an object of this invention to provide an apparatus for separating catalyst from hydrocarbon gases and for discharging catalyst and hydrocarbon gases from a downcomer wherein the apparatus provides the advantages of a closed system and facilitates the use of downcomers and cyclone separators in the same part of the processing apparatus. It is a further object of this invention to provide a separation system that accommodates relative differential expansion between the different components and connecting conduits.

BRIEF DESCRIPTION OF THE INVENTION

This invention is an FCC separation apparatus that uses a disengaging vessel to surround a downcomer that extends through a central portion of the top of the vessel, to contain radial discharge arms for establishing a cyclonic separation of catalyst from gases in a confined space and to return the gases to the cyclones for further separation in compact conduit arrangement. Inflow of catalyst and gases from the downcomer and outflow of a primarily gaseous stream occur across the top of a separation vessel. The separation vessel discharges catalyst downwardly for further stripping. Gases from stripping of the catalyst can be routed back to the cyclone separators through ports in the gas collection conduits that carry hydrocarbon gases from the top of the separator to the cyclones. The compact arrangement of the gas collection conduit and the downcomers minimizes any additional containment volume that is necessary to provide the necessary equipment for efficient separation of catalyst from gases and the minimization of hydrocarbon residence time in the separation system.

Accordingly, in one embodiment this invention is an apparatus for separating a hydrocarbon gas and catalyst mixture from a reaction downcomer that is used in the fluidized catalytic cracking of an FCC feedstock. The apparatus includes a separation vessel and a downcomer conduit that contains the mixture of FCC catalyst and gaseous hydrocarbons. The downcomer conduit extends through a central portion of the top of the separation vessel. At least two discharge conduits, having proximate ends radially projecting from the downcomer conduit, discharge the catalyst and gaseous mixture from the riser through distal ends that define discharge openings. The discharge conduit and discharge openings have an orientation that imparts a tangential velocity to the mixture as it is discharged from the discharge openings. The separation vessel defines a gas collection port which communicates with a proximate end of gas collection conduit. The gas collection conduit withdraws hydrocarbon gases from the separation vessel and passes them from its distal end in closed communication to a cyclone separator. The gas collection conduit includes means for adjusting its length to permit relative vertical movement between the separation vessel and the cyclone. The gas collection outlet defined by the cyclone is in closed communication with the means for recovering hydrocarbon gases from the apparatus. The cyclone also defines a catalyst outlet and the separator vessel defines a separator catalyst outlet. Means are provided for collecting and stripping catalyst from the cyclone and separator catalyst outlets and for withdrawing spent catalyst from the apparatus.

In another embodiment, this invention is an apparatus for separating a hydrocarbon gas and catalyst mixture from multiple reaction downcomers contained in a fluidized catalytic cracking process. The apparatus includes a plurality of separation vessels and a single downcomer conduit extending into each of the separation vessels through a central top portion. Each downcomer has at least two discharge conduits with proximate ends that project radially from each of the downcomers and distal ends that define discharge openings. The discharge openings provide a tangential velocity to the mixture as it is discharged from the riser. A gas collection port, defined by the central opening in the top of each separation vessel, delivers separated gases in sealed communication to a proximate end of a gas collection conduit that withdraws hydrocarbon gases from the separation vessel. The gas collection conduit coaxially surrounds a portion of the downcomer conduit to provide an annular flow path for the hydrocarbon gases. The distal end of the gas collection conduit communicates with a cyclone separator and delivers hydrocarbon gases into the cyclone separator. A gas outlet defined by the cyclone communicates with means for recovering hydrocarbon gases from the gas outlet. The cyclone defines a cyclone catalyst outlet that delivers catalyst for combination with catalyst separator from the catalyst outlets. Means are provided for collecting and stripping the catalyst from the cyclone and separator catalyst outlets and for withdrawing spent catalyst from the apparatus. A lower portion of the separation defines separator catalyst outlets that discharge separated catalyst from the separator.

A reaction conduit having a downcomer portion that enters the top of a separation vessel is an essential element of this invention. The downcomer portion of the reaction conduit may be entirely vertical with top to bottom flow. Alternately, the downcomer portion may provide a downstream leg of a riser having an overall "U-shaped" configuration where the catalyst gas mixture undergoes contacting in an upflow direction initially and then turns to a downflow direction in the downcomer portion.

The separator vessel is necessary to surround the outlet end of the riser and to provide a low volume containment of the catalyst and gases as the initial separation occurs. The low volume reduces the residence time of the gases as they are separated from the catalyst. Reduced residence time lowers thermal cracking and improves overall selectivity of products. The downcomer separation vessels, cyclones and connecting conduits may be arranged with an outer containment vessel referred to as the reactor vessel or they may be designed without an external containing vessel in which case all of the separation elements must be designed to withstand the fall internal pressure of the FCC process.

Conduits that connect the top of the separation vessel with the inlets of the cyclones for communicating separated gases thereto are designed to prevent a rigid connection between the cyclones and an independently supported separation vessel. When the separation vessel is supported independently from the cyclones, eliminating the rigid connection relieves the stresses that would be induced on the vessels and equipment due to previously mentioned differential vertical expansion. A rigid connection can be eliminated by providing means for relative vertical movement between the separation vessel and the inlets to the cyclones along the gas collection conduits. An expansion joint, or a slip joint, will usually provide the means for allowing adjustment of the gas collection conduit length between the separation vessel and the cyclones. The conduit configuration and the location of the separation vessel support influence the expansion joint arrangement. It is possible to use a single expansion section in the gas collection conduit in at least two alternate arrangements. In one arrangement, the separation vessel is supported at its bottom while the gas collection conduit coaxially surrounds the downcomer and has an upper portion attached to the riser such that the cyclone and downcomers are free to expand as a unit. In the coaxial gas collection conduit arrangement, the separation vessel is supported independently of the downcomer along with the lower portion of the gas collection conduit. A flexible sealing element such as an expansion joint, or a slip joint, connects the upper and lower portions of the gas collection conduit. Alternately, independent conduits can communicate the top of the separation vessel with the cyclone inlets by providing an expansion section in each gas collection conduit. In the alternate arrangement the separation vessel is supported from the downcomer conduit.

The multiple downcomer arrangement can be arranged to eliminate expansion elements altogether. The cyclone, downcomers and conduits all have supported points that are located relatively close together. Close support leaves the downwardly extended portions of the cyclones, downcomers and conduits free to expand at their own rate.

Further details of the invention are disclosed in the following description of the specific embodiments.

DETAILED DESCRIPTION OF THE PREFERRED EMBODIMENTS

Figure 1:
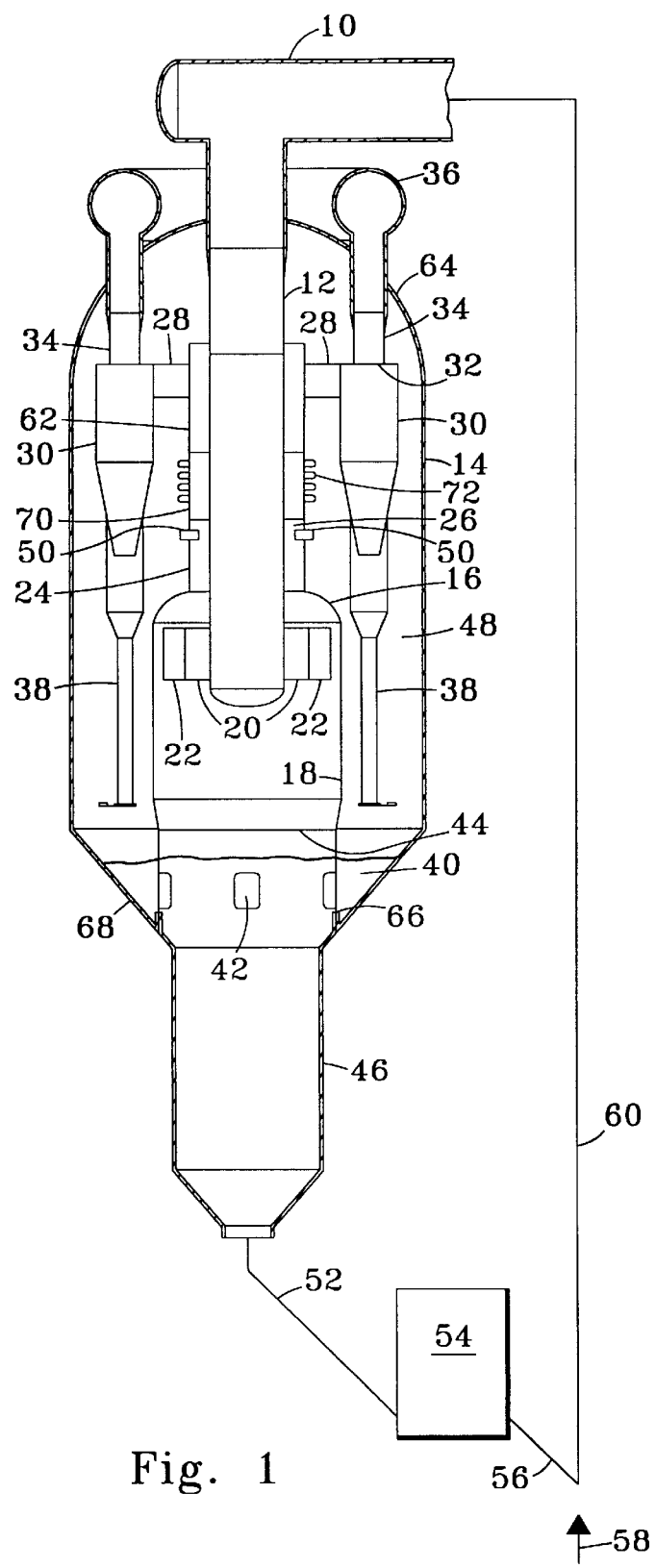
FIG. 1 shows a sectional elevation of an FCC reactor arranged in accordance with this invention along with a schematic representation of the rest of the FCC process.

Looking then at FIG. 1, a U-shaped riser section 10 downwardly directs a mixture of catalyst and gaseous hydrocarbons into a downcomer 12. Downcomer 12 passes through the shell of a reactor vessel 14. Inside reactor vessel 14, downcomer 12 passes through the central portion of a top head 16 of a separation vessel 18. The end of downcomer 12 terminates with two discharge arms 20 with proximate ends that extend radially from the downcomer 12. The mixture of gases and hydrocarbon flows from proximate ends of arms 20 through openings 22 at the distal ends of arms 20. Openings 22 discharge the gases and hydrocarbon mixture into the separation vessel 18. The openings are arranged to provide a tangential velocity to the exiting gases and catalyst and may also have an orientation that provides a downward component of velocity to the exiting catalyst and gases. The end of the downcomer will ordinarily have at least two or more discharge arms arranged symmetrically around the end of the downcomer. Separation vessel 18 performs the cyclonic separation as heavier catalyst particles migrate to the outside of the vessel and fall downwardly while lighter gases readily change direction for upward transport out of the top of the separation vessel.

Separated hydrocarbon gases pass upwardly out of separation vessel 18 through a gas collection conduit 24 that surrounds downcomer 12 and extends coaxially upwardly to define an annular flow passage 26. The upper end of gas collection conduit 24 passes separated hydrocarbon gases in closed communication to inlets 28 of cyclones 30. Cyclones 30 perform a cyclonic separation of gases from catalyst particles in the usual manner. With the cyclones, small amounts of additionally entrained catalyst particles migrate downwardly through cyclones 30 in an ordinary cyclonic separation while lighter gases again pass upwardly. The cyclone defines an outlet 32 that transfers the gases in closed communication to means for recovering the gaseous hydrocarbons. The means for recovering the gaseous hydrocarbons in this embodiment include catalyst outlet tubes 34 that also support cyclones 30 from the shell of reactor vessel 14. A manifold 36 collects gaseous hydrocarbons from the outlet tubes to provide an additional portion of the recovery means which transfers the recovered gaseous hydrocarbons to product separation facilities for recovery of different product streams and gases.

Catalyst that passes downwardly through cyclones 30 exits the cyclones through dip pipes 38. Dip pipes 38 discharge the catalyst into a catalyst bed 40 located at the bottom of reactor vessel 14. Apertures 42 defined by the bottom of separation vessel 18 pass catalyst from bed 40 in combination with catalyst from the separator catalyst outlet 44 into a stripper 46 that contacts the catalyst particles with a stripping gas for displacement of remaining hydrocarbon gases in the void volume of the catalyst. Stripping gases and displaced hydrocarbon gas pass upwardly through separation vessel 18 for removal with the separated hydrocarbon gases. Any additional gases in the unoccupied interior or reactor space 48 of reactor vessel 14 vent back into gas collection conduit 24 through ports 50 defined in the top of the gas collection conduit. Additional gases may be carried into reactor space 48 with the catalyst flowing out of dip pipes 38. Additional gases may also comprise fluidization gas added to maintain bed 40 in a fluidized state.

Stripped catalyst flows out of vessel 46 through a spent catalyst standpipe, shown schematically as line 52, into a regeneration zone 54. Regenerated catalyst from regeneration zone 54 is transferred via a standpipe 56 into contact with a hydrocarbon feed 58. The reaction mixture of the feed and regenerated catalyst particles ascends through a riser 60 and flows downstream through horizontal riser section 10 to downcomer 12, as previously described.

In the arrangement of FIG. 1, cyclones 30, downcomer 12, and an upper portion 62 of the gas collection conduit are all supported by connection to the upper head 64 of the reactor vessel 14. All of these components are free to expand downwardly together when the separation system operates at the usual elevated temperatures of the FCC process. The remainder of the separation system, separation vessel 18, and the lower portion of gas collection conduit 24 are supported from the bottom 66 of separation vessel 18 which rests in fixed attachment to a conical section 68 that forms a transition between reactor vessel 14 and stripper 46. Under the normal elevated operating temperatures, the separation vessel as well as the lower portion of conduit 24 expands upwardly. An expansion joint 70 maintains sealed communication between the upper and lower portions of the gas collection conduit 24. The expansion joint uses a corrugated, thin wall bellows element 72 as the active component for adsorbing relative axial movement. The design of such expansion elements is well known to those skilled in the art. Thus, the arrangement of FIG. 1 allows the use of a compact and highly efficient separation system while allowing the necessary expansion between elements that are supported from different portions of the reactor vessel.

Figure 2:
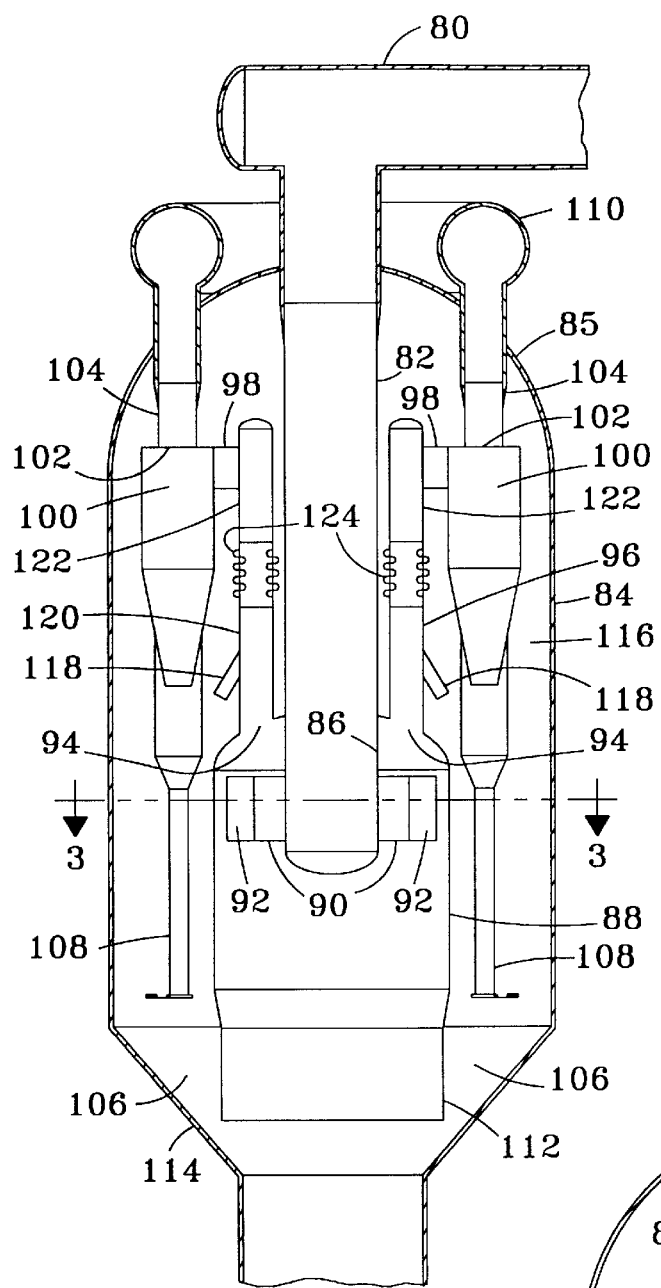
FIG. 2 is a schematic representation of an alternate arrangement for the separation portion of the reactor vessel depicted in FIG. 1.

FIG. 2 shows a modification to the arrangement of FIG. 1 wherein support of the different components in the separation arrangement is modified by replacing the coaxial annular flow path of the gas collection conduit with a plurality of separate gas collection conduits. In the arrangement of FIG. 2, a mixture of catalyst and hydrocarbon gases passes from a horizontal section of a riser 80 to a downcomer section 82 and into a reaction vessel 84. The downcomer 82 passes through a central top portion 86 of a separation vessel 88. A plurality of discharge arms 90 discharges the mixture of catalyst and hydrocarbon gases through tangentially oriented outlets or discharge openings 92 to effect the initial separation of gases and catalyst within separator vessel 88 in substantially the same manner as previously described. A plurality of gas collection ports 94 defined in the top head or portion 86 encircles the central opening for downcomer 82. Hydrocarbon gases as well as other vapors that enter open interior 116 of reactor vessel 84 are again passed into the gas collection conduits via collection ports 118. Gas collection conduits 96 pass hydrocarbon gases and small amounts of entrained catalyst from separation vessel 88 to inlets 98 of cyclones 100. Cyclones 100 operate in substantially the manner as previously described to recover fine catalyst particles from the gases that enter therein and withdraw gases overhead through cyclone outlets 102 and cyclone outlet tubes 104 while returning the recovered catalyst to a bed 106 via dip pipes 108. Hydrocarbon gases are again collected for further separation into products by a manifold 110 while catalyst recovered from the cyclones joins catalyst recovered by the separation vessel for stripping followed by regeneration.

An important difference between FIGS. 1 and 2 is the support arrangement for the downcomer, separation vessel and cyclones. In the arrangement of FIG. 2, downcomer 82 supports separation vessel 88 by fixed attachment thereto at the central opening in top head 86. Downcomer 82 as well as separation vessel 88 expand freely downward together as a unit. Bottom 112 of separation vessel 88 is spaced away from a lower cone 114 of reactor vessel 84. Maintaining a space between separation vessel 88 and conical section 114 provides a flow path for catalyst from the cyclones to combine with catalyst falling from the separation vessel and allows for thermal expansion. The downcomer conduit 82 through separation vessel 88 also supports a lower portion 120 of gas collection conduit 96. The cyclones and an upper portion 122 of gas collection conduits 96 are supported by attachment of the cyclone outlet tubes 104 to the top head of reactor vessel 84. As a result of the rigid connection of the downcomers, gas collection conduits, and cyclones to different support points, high stresses can still be induced in the different components despite the close proximity of the cyclone tube attachments and the downcomer attachments on reactor head 85. Forces associated with the thermally induced displacements are relieved again by the use of expansion sections 124 across gas collection conduits 96. The expansion portions 124 again contain thin, flexible bellows elements as previously described.

Figure 3:
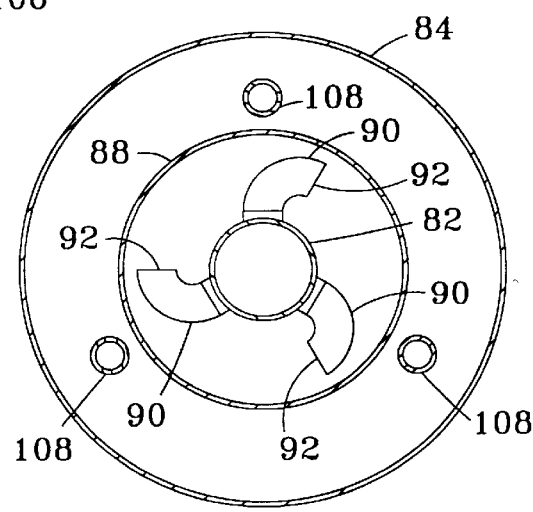
FIG. 3 is a section of FIG. 2 taken at line 3—3.

FIG. 3 shows an arrangement for the discharge conduits at the lower portion of downcomer 82. The figure shows an arrangement of three curved arms extending radially from downcomer 82 with the plurality of discharge openings 92 oriented in a unitary direction. The depicted arrangement of three arms and three cyclone dip pipes 108 also depicts the typical symmetry of the arrangement which is not restricted to three arms or cyclones, but may have any symmetrically arranged number of such components.

Figure 4:
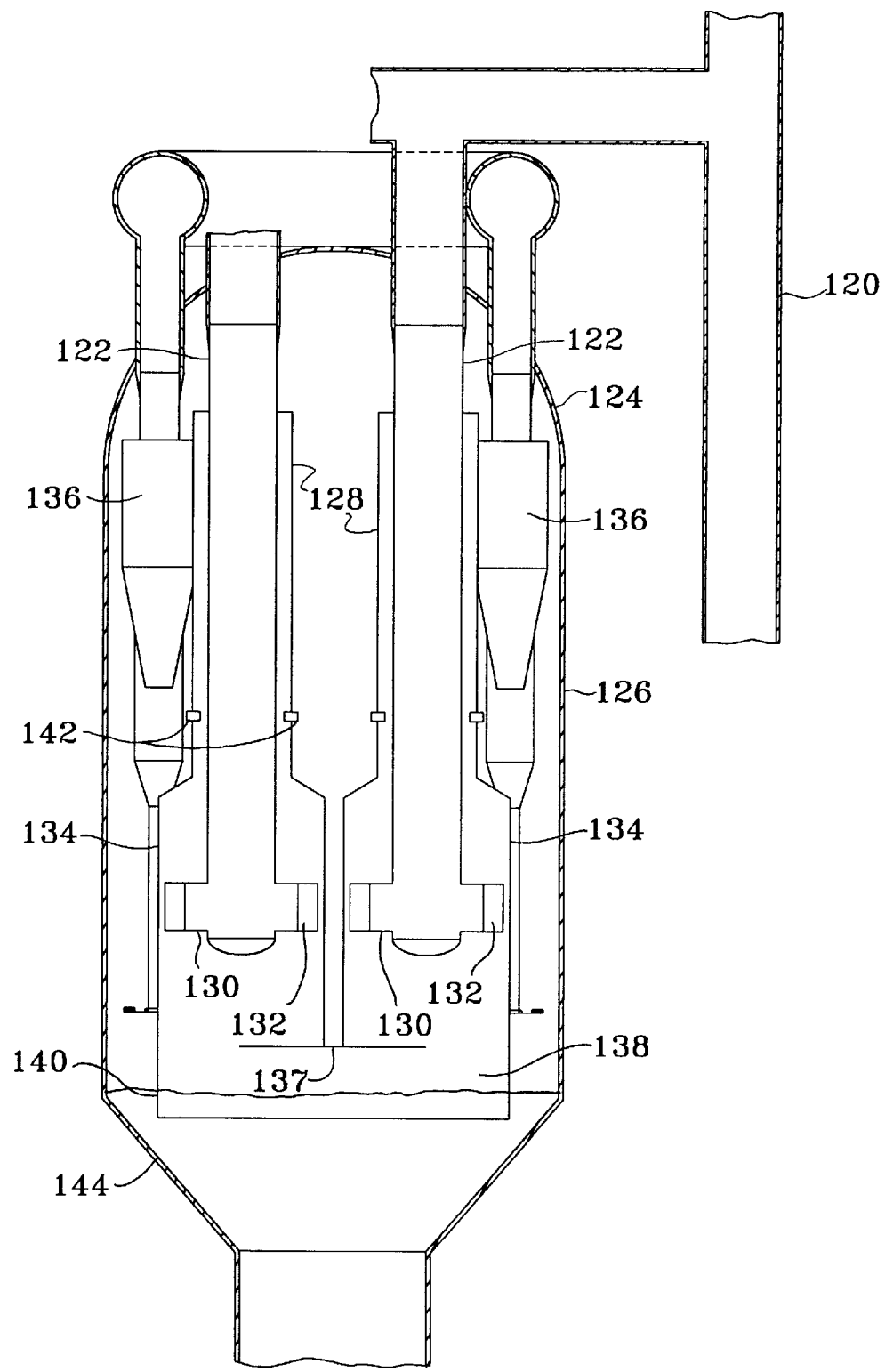
FIG. 4 is a further modification of the separation section of the reactor shown in FIG. 1 containing modifications to accommodate multiple downcomers.

FIG. 4 shows the arrangement of this invention adapted for multiple downcomers. In this arrangement, two or more risers 120 communicate catalyst and hydrocarbon gases to multiple downcomers 122 that pass through an upper head 124 of a reactor vessel 126. In a manner analogous to that described in FIG. 1, the downcomers 122 extend from the reactor shell downwardly through gas collection conduits 128 and define discharge arms 130 with openings 132. Gases separated from the catalyst and hydrocarbon gas mixture in separation vessels 134 again pass upwardly through the gas collection conduits 128 into cyclones 136 for further separation of the entrained catalyst from hydrocarbon gases. Gas collection and catalyst recovery from cyclones 136 occur in the same manner as previously described. Ports 142 again vent the interior of vessel 126. FIG. 1 differs from FIG. 4 by the provision of the multiple downcomers, the arrangement of the separation vessels, and the support system of the separation arrangement. Each downcomer extends into an individual separation vessel. A horizontal plate 137 ties the individual separation vessels 134 together about their bottoms. Below plate 137 a common collection space 138 is defined by a skirt 140 that encircles the periphery of skirt of individual separation vessels 134. Skirt 140 ties the multiple downcomers together so that they function structurally as a unit. Attachment of the gas collection conduits to the multiple downcomers provides a plurality of support points to adequately hold the individual separation vessels and the common elements such as plate 137 and skirt 140. The bottom of skirt 140 is spaced above a lower cone 144 in order to provide unrestrained, downward, vertical expansion of the separation assembly. The space between transition cone 144 and lower skirt 140 also provides a gap for the common collection of catalyst from the cyclones and the separation vessels. In this manner, the efficiently contained separation system can also accommodate multiple downcomers in a relatively confined space.

We claim:

1. An apparatus for separating a hydrocarbon gas and catalyst mixture from a reaction downcomer in the fluidized catalytic cracking of an FCC feedstock, said apparatus comprising:

a separation vessel;

a reactor vessel surrounding the separation vessel;

at least one downcomer conduit for containing a mixture of FCC catalyst and gaseous hydrocarbons, said downcomer conduit extending through the top of the reactor vessel and through a central portion of the top of said separation vessel;

at least two discharge conduits having proximate ends radially projecting from said downcomer conduit in the separation vessel and distal ends defining a discharge opening oriented to provide a tangential velocity to said mixture as it is discharged from said discharge openings;

a gas collection port defined by the top of said separation vessel;

at least one cyclone separator fixed to the top of the reactor vessel;

a gas collection conduit in communication with said gas collection port at a proximate end for withdrawing hydrocarbon gases from said separation vessel and in communication with the cyclone separator at its distal end for delivering hydrocarbon gases thereto, said gas collection conduit having means for adjusting its length to permit relative vertical movement between said cyclone separator and said separation vessel;

means for recovering hydrocarbon gases from said apparatus;

a gas outlet, defined by said cyclone separator, in communication with the means for recovering hydrocarbon gases from said apparatus;

a cyclone catalyst outlet defined by said cyclone separator;

a separator catalyst outlet defined by a lower portion of said separator vessel; and, means for collecting and stripping catalyst from said cyclone separator and separator catalyst outlet and for withdrawing spent catalyst from said apparatus.

2. The apparatus of claim 1 wherein said at least one downcomer conduit includes at least two downcomer conduits that communicate with said separation vessel.

3. The apparatus of claim 1 wherein said gas collection conduit coaxially surrounds said downcomer conduit to define an annular flow path for said hydrocarbon gases.

4. The apparatus of claim 1 wherein said means for stripping catalyst produces a stripping gas and said gas collection conduit defines a stripping gas port for receiving said stripping gas.

5. The apparatus of claim 3 wherein said means for stripping catalyst produces a stripping gas and said gas collection conduit defines a stripping gas port at the top of said annular flow path.

6. The apparatus of claim 1 wherein said at least one cyclone separator comprises least two cyclone separators.

7. The apparatus of claim 6 wherein each cyclone separator communicates with a separate gas collection conduit.

8. The apparatus of claim 1 wherein said means for adjusting comprises an expansion joint located in said gas collection conduit.

9. The apparatus of claim 8 wherein said separation vessel is fixed to the bottom of said reaction vessel and said downcomer conduit is fixed to the top of said reaction vessel.

10. The apparatus of claim 8 wherein said separation vessel is fixed to said downcomer conduit.

11. An apparatus for separating a hydrocarbon gas and catalyst mixture from multiple reaction downcomers in the fluidized catalytic cracking of an FCC feedstock, said apparatus comprising:

a plurality of separation vessels;

a reactor vessel surrounding the plurality of separation vessels;

a single downcomer conduit extending into each separation vessel for containing a mixture of FCC catalyst and gaseous hydrocarbon, each of said downcomer conduits extending through the top of the reactor vessel and through a central portion of the top of said respective separation vessel;

at least two discharge conduits having proximate ends radially projecting from each of said downcomer conduits and distal ends defining discharge openings oriented to provide a tangential velocity to said mixture as it is discharged from said discharge openings;

at least one cyclone separator fixed to the top of the reactor vessel;

a gas collection port defined by a central opening in the top of each separation vessel;

a gas collection conduit in sealed communication with each gas collection port at a proximate end for withdrawing hydrocarbon gases from said separation vessel and in communication with the cyclone separator at its distal end for delivering hydrocarbon gases thereto, said gas collection conduit coaxially surrounding a portion of said downcomer conduit to provide an annular flow path for said hydrocarbon gases;

means for recovering hydrocarbon gases from said apparatus;

a gas outlet defined by said cyclone separator in communication with the means for recovering hydrocarbon gases from said apparatus;

a cyclone catalyst outlet defined by said cyclone separator;

a separator catalyst outlet defined by a lower portion of each of said separator vessels;

means for collecting and stripping catalyst from said cyclone separator and separator catalyst outlets and for withdrawing spent catalyst from said apparatus; and a common plate joining the plurality of separation vessels.

12. The apparatus of claim 11 wherein said means for stripping catalyst produces a stripping gas and at least one of said gas collection conduits defines a stripping gas port for receiving said stripping gas.

13. The apparatus of claim 11 wherein said at least one cyclone separator comprises at least two cyclone separators, each cyclone separator communicates with a separate gas collection conduit.

14. The apparatus of claim 11 wherein said gas collection conduits have means for adjusting their length to permit relative vertical movement between said cyclone separator and said separation vessel.

15. The apparatus of claim 14 wherein said means for adjusting comprises an expansion joint located in each of said gas collection conduits.

16. The apparatus of claim 11 wherein said plurality of separation vessels has said downcomer conduits fixed to the top head thereof.

17. The apparatus of claim 16 wherein said common plate joins the plurality of separation vessels at their bottom sections, the common plate has a skirt that extends below said common plate and encircles said common plate and the projection of the combined circumference of said separation vessels.

* * * * *

UNITED STATES PATENT AND TRADEMARK OFFICE
CERTIFICATE OF CORRECTION

PATENT NO. : 5,843,377
DATED : 12/01/98
INVENTOR(S) : JAMES A. FANDEL, DAVID A. LOMAS, STEVEN NIEWIEDZIAL, DANIEL R. JOHNSON, AND JAMES ALTHOFF

It is certified that error appears in the above-identified patent and that said Letters Patent is hereby corrected as shown below:

In Claim 6, line 35, the word - - at - - should be inserted between the words "comprises" and "least".

Signed and Sealed this

First Day of June, 1999

Attest:

Q. TODD DICKINSON

*Attesting Officer*    *Acting Commissioner of Patents and Trademarks*